Nov. 10, 1959 H. C. A. VAN DUUREN ET AL 2,912,578
CYCLIC TUBE COUNTING CIRCUIT
Filed Jan. 25, 1955 11 Sheets-Sheet 1
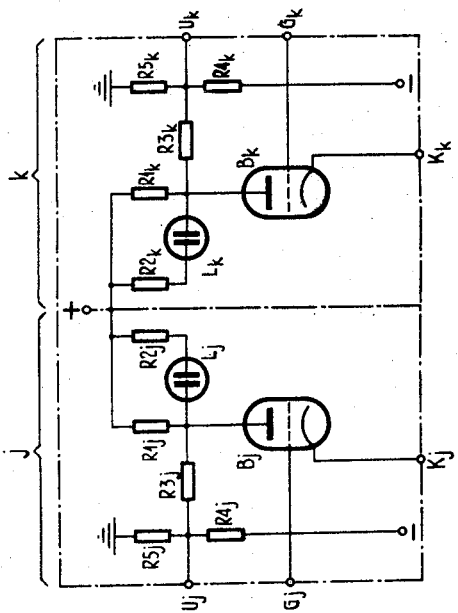
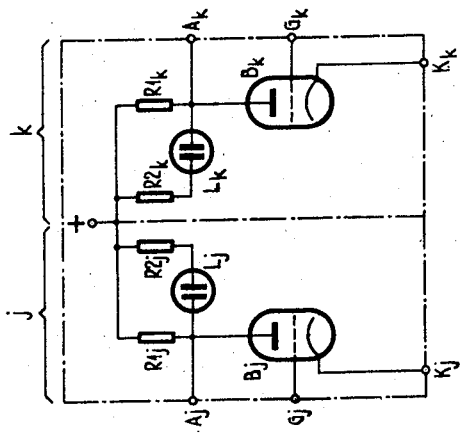
INVENTORS.
Hendrik Cornelis Anthony van Duuren
Antonie Snijders INVENTORS.
Hendrik Cornelis Anthony van Duuren
Antonie Snijders INVENTORS.
Hendrik Cornelis Anthony VanDuuren
Antonie Snijders
By Brown, Jackson, Boettcher & Dienner
Attys

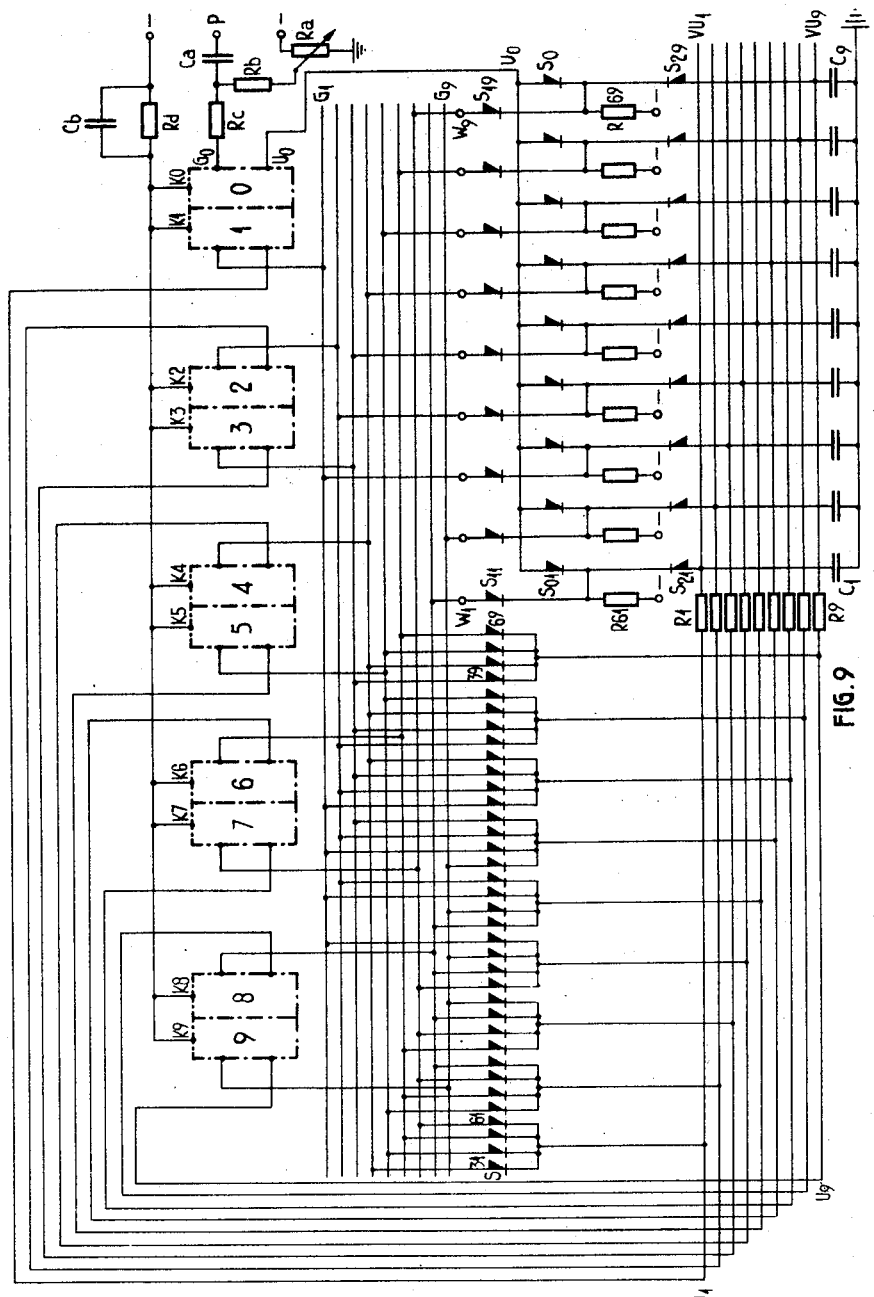

United States Patent Office 2,912,578
Patented Nov. 10, 1959

2,912,578

CYCLIC TUBE COUNTING CIRCUIT

Hendrik Cornelis Anthony Van Duuren, Wassenaar, and Antonie Snijders, The Hague, Netherlands, assignors to Staatsbedrijf der Posterijen, Telegrafie en Telefonie, The Hague, Netherlands Application January 25, 1955, Serial No. 483,989

Claims priority, application Netherlands January 27, 1954

17 Claims. (Cl. 250—27)

The present invention relates to an electronic counting device and particularly to a novel electronic tube counting circuit.

The electronic counting circuit of the invention is basically concerned with a circuit arrangement comprised of a number of tubes which are operable to and stably locked in each of a number of different states, each state representing a different count. In obtaining the desired flexibility of count, the number of tubes which are conductive and the number of tubes which are nonconductive is the same in each state. A counting circuit having these general operating characteristics has been set forth in the copending application which was filed on September 7, 1954 by Hendrik Cornelis Anthony van Duuren and Antonie Snijders and was assigned Serial No. 454,555. In the circuit there taught, a number of $n$ tubes are operable to a number of states determined by $$\frac{n!}{p!(q)!}$$

in which $n$ is the total number of tubes, $p$ is the number of tubes which are simultaneously conductive in a state, and $q$ is the number of tubes which are nonconductive in each state. In such arrangement a locking element have "$n$" branches is provided for each state, and it is immediately apparent that as the number of states to be represented by the counting device increases, a correspondingly larger number of components are required in each locking element. Further as the number of tubes increases, the load for each tube will likewise be of a much higher order.

It is an object of the present invention to provide an arrangement which includes the advantages of such type system, and in which the load for each counting tube in the circuit is independent of the number of counting tubes used in the counting circuit so that the number of counting tubes in a circuit is not limited by the number of components in the locking circuits. It is a particular object of the invention to provide an arrangement wherein in a circuit of $n$ counting tubes requires only $n$ locking elements, the number of components in the locking elements being less in number than the number of counting tubes in the counting circuit.

As shown hereinafter the number of tubes in the preferred embodiments of the counting chain is equal to the number of states, although additional artifices may be used for the purpose of extending the number of states in circuits of larger size. In each embodiment disclosed, the construction of the locking element may be much simpler than those utilized in previous counting circuits of this general type which have been known heretofore in the art. It will be apparent that the increased number of counting tubes provided is more than offset by the more simple construction and reduced cost of the components of the locking elements provided in the present arrangement. Further the switching of the chain responsive to the receipt of each count advancing pulse is accomplished in a more expeditious manner. The novel cyclic order of operation of the counting tubes through the different states renders the counting chain particularly suitable for use in accomplishing frequency division for the control of gating circuits, and also for deriving alternating current voltages of different phases for purposes of synchronization and regulation. Such type of equipment is set forth more fully in the copending application by Henrik Cornelis Anthony van Duuren which was filed on March 2, 1953 and which was assigned Ser. No. 339,702.

It is a further and specific object of the invention to provide a counting circuit having a set of counting tubes which are operative to $n$ different states, wherein an arbitrary number $p>1$ are conductive, and $q$ equals $n$-$p$>1 being nonconductive, the tubes being maintained stable in such position as operated thereto by locking elements of a resistive character. In a preferred embodiment, each one of an $n$ number of locking elements has the elements thereof connected between the anodes of a group of $a$ successive counting tubes, and the grids of $b$ other successive counting tubes in cyclic succession, $a$—$b$ being equal to $p$—$q$, the different locking elements being connected between different groups.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements and in which:

Figs. 1 and 2 illustrate basic circuits of the counting tubes;

Figs. 8, 9 and 10 are exemplary illustrations of a 9-fold counting circuit according to the general principles of Fig. 5;

As noted in the description of the drawings, Figures 3–12 are directed to different embodiments of the counting devices, each of which includes a set of counting tube circuits. The basic circuits of the counting tube circuits have been shown schematically in each of the Figures 3–12, and are set forth in detail in Figures 1 and 2.

With reference to Figure 1, it is apparent that each pair of blocks identified as $j$, $k$ respectively thereat may comprise a double triode tube B having sections $B_j$ and $B_k$ respectively, it being noted that a pair of single triodes may be used in lieu thereof in the conventional manner. The plate members of each tube are connected over an anode resistor $R1_j$, $R1_k$ in a known manner to a B+ source and also to output terminals $A_j$, $A_k$, the control grids of each section are connected to terminals $G_j$ and $G_k$, and the cathodes are connected to terminals $K_j$ and $K_k$ respectively. An indicator tube (neon tube) $L_j$, $L_k$ is connected in series with resistor $R2_j$, $R2_k$ across the anode resistor $R1_j$, $R2_k$ in each circuit to permit energization of the neon lamp whenever the tube section associated therewith is rendered conductive by application of a positive pulse to its associated grid terminal $G_j$, $G_k$.

If rectifiers are to be used in the locking elements, it is important by reason of the limited reverse voltage rating of the rectifiers that the voltage step at anode A be reduced at the time of transition of the tube from the conductive to the non-conductive state (or conversely) to about the grid voltage step corresponding to the anode voltage step (but of a somewhat larger value).

With reference to Figure 2, the anode voltages are reduced to such value by the inclusion of a potentiometer set including resistor R3, which is connected to the anode of the tube section, and resistor R4 which is connected to the negative voltage source as shown. A third resistor R5 is connected between the junction of resistor R3 and R4 and ground for stabilization purposes. The other pole of the negative voltage source (—), as well as the other pole of the positive voltage source are also connected to ground, the circuit being so dimensioned that the grid voltage step lies nearly symmetrical with respect to ground.

As shown in Figure 2, the reduced anode voltages $U_j$ and $U_k$ are applied to the respective output terminals, and in the following figures the symbol U always denotes a reduced anode voltage and the symbol A denotes a real anode voltage. In such arrangements, the cathode K of the counting tubes and the switching tubes may be connected to ground if desired.

In Figures 3–12, however, the cathodes K of the switching tube section 0 and cathodes $K_1$ and $K_n$ of the counting tubes $l$ to $n$ are connected over a resistor $R_d$ and a decoupling capacitor $C_b$ to the negative voltage source to provide negative grid bias voltage for the tube elements of each section.

Figure 3:
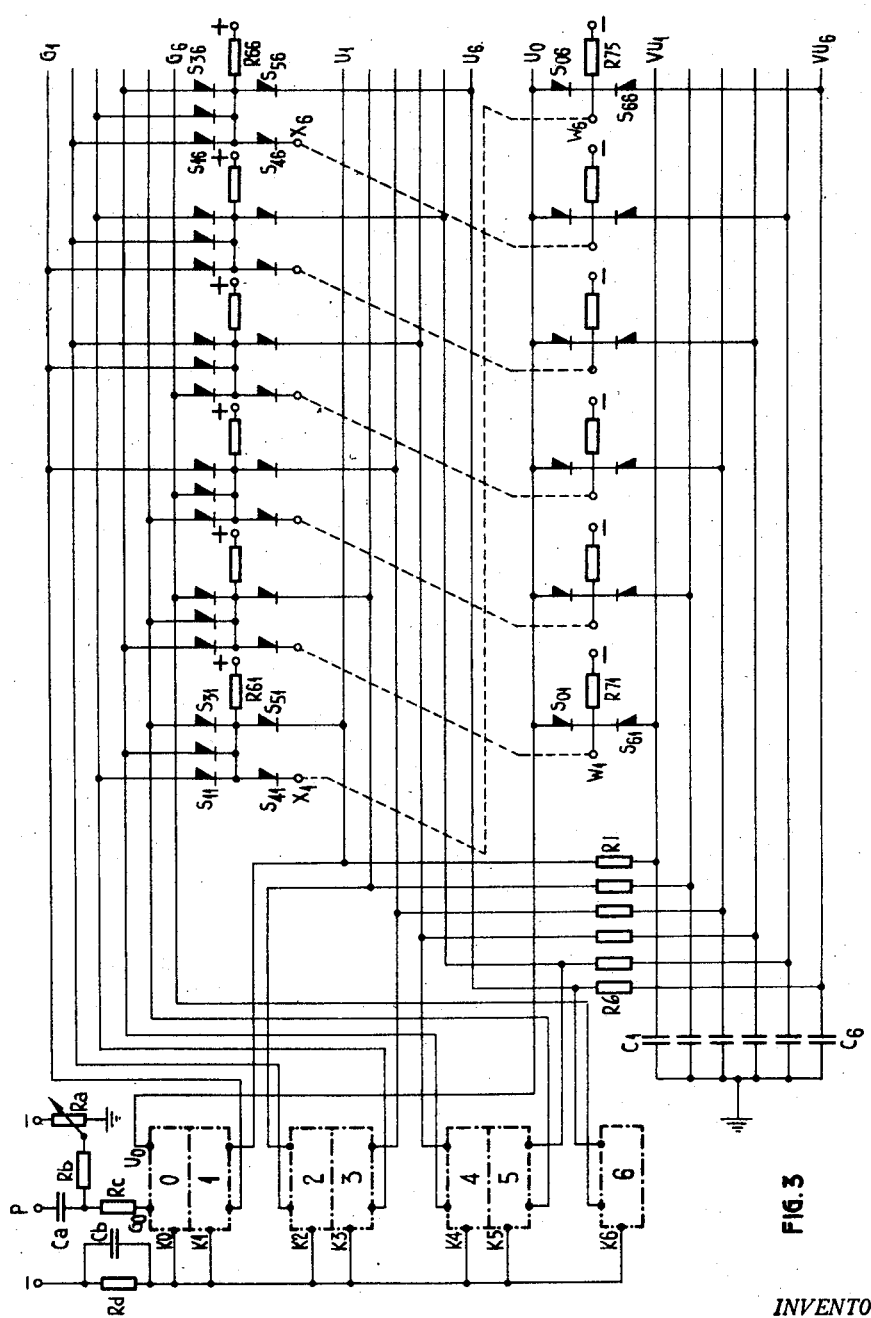
Figs. 3 and 4 illustrate by way of example a 6-fold and a 5-fold counting circuit, respectively.

With reference now to Figure 3, a specific embodiment of the tube circuit in a six-fold counting chain circuit is shown thereat. Basically such counting circuit comprises an $n$ number of tubes in which a $p$ number of tubes are conductive and a $q$ ($n-p$) number of tubes are non-conductive, the particular ones of the tubes which are conductive and non-conductive at any time representing a different preassigned state.

More specifically a switching section 0 (the first section of a first set, such as shown in Fig. 2) is connected to control the operation of six successive tube sets 1–6 to operate to successive states, wherein $p$ tubes of the six tubes are conductive and $q$ tubes of the six tubes are non-conductive. The arrangement further includes six switching networks, such as switching network $W_1$, $S_{01}$, $S_{61}$, $R_{71}$, each of which is connected by conductor $U_0$ to the output of the switching tube section 0 and by conductors $VU_1$—$VU_6$ to delay networks $R_1$, $C_1$, $R_6$, $C_6$ and the delayed anodes of the successive counting tube sections 1–6. Thus the first switching network is connected to switching conductor $U_0$ over the delay network consisting of capacitor $C_1$ and resistor $R_1$ to the anode of the first switching tube 1. Similar connections for the other switching circuits are set forth in the drawing.

The arrangement additionally includes six locking networks, the number of locking networks being consistent with the number of tubes in the counting arrangement. Each locking network, such as the illustrated network having input terminal X1, comprises a number of rectifier elements, (five in the example of Fig. 3) a first set, as for example $S_{51}$, of which are connected to the anodes of $a$ successive counting tubes (tube 1), and the second set, as for example $S_{11}$, $S_{21}$, $S_{31}$, of which are connected between the control grids of $b$ successive counting tubes (tubes 3, 4, 5) which are different than the tubes to which the first set of rectifiers are connected. A rectifier, such as $S_{41}$, couples the output of a corresponding one of the switching networks ($W_6$ in Figure 3) to the locking network.

The central points are all connected via high ohmic resistors to the positive voltage source if they follow the more negative of the voltages applied to the controlling rectifiers, and to a negative voltage source in the opposite case. Such practice is well known in the art.

As will be shown hereinafter, any arbitrary state of conditions to be represented may be assigned to each locking network, and the connections of the components thereof will vary in accordance therewith. In the present arrangement, for exemplary purposes, it is assumed that the first state is represented by having tube sections 1, 2, in a conductive condition and tube sections 3, 4, 5, 6, in a nonconductive condition. As will be shown, the switching networks are operative in response to the receipt of an impulse over the switching conductor $U_0$ to advance the equipment from the first state to the second state, and to effect the locking of the circuits in such state until a subsequent count is received.

As noted above, the connection of the respective components in the locking and switching networks will be determined by the particular number of $p$ components which are rendered conductive in each state, and the number of $q$ components which are to be rendered nonconductive in each state. Basically speaking with $n$ counting tube sections, each of $n$ locking networks is connected between the anodes of $a$ successive counting tubes and the control grids of $b$ successive counting tubes, the $b$ counting tube sections being placed exactly or nearly diametrically opposite the group of $a$ counting tube sections the term "diametrically opposite" referring to the related positions of the tube sections in the operating sequence. The values of $a$ and $b$ may be chosen arbitrarily as long as the condition $p-q=a-b$ is maintained. For reasons of economy which will become apparent in the further description, $a$ and $b$ are maintained as small as possible. That is, assuming a network, such as shown in Figure 3, wherein the number of tubes equals six, the condition may be selected where $p$ equals two and $q$ equals 4. In such case $a$ may equal 2 and $b$ may equal 4, but such condition will be somewhat uneconomical.

In another possible combination $a$ equals 1 and $b$ equals 3 ($p-q$ equals 2 and $a-b$ equals 2). Such arrangement has been illustrated in Figure 3, rectifiers $S_{11}$, $S_{21}$, $S_{31}$ being connected respectively, to the grids of the tube sections 3, 4 and 5 respectively, and since $a$ equals 1, it is not necessary to connect a rectifier to the branch which extends to the anode $U_1$. Rectifier $S_{51}$, however, is included for switching purposes. If $a$ and $b$ had been chosen to be 2 and 4, respectively, two rectifiers would be connected to the anodes $U_1$ and $U_2$ and arranged with the central point of the relevant locking element following the more positive voltage. In such event the central point would then be connected via four other rectifiers to the grids of tube sections 3—6 which are diametrically opposite anodes $U_1$ and $U_2$ in such manner that the grids follow the most negative voltage. The term "diametrically opposite" as used herein refers to the relative positions of the tube sections in the operating sequence. Thus, the tube which is farther from a given tube than any other tube in the system is "diametrically opposite" such tube in the system.

In the arrangement disclosed in Figure 3, $a$ equals 1 and $b$ equals 3, and the following states of the counting circuit are possible (x-conductive) (o-nonconductive).

| State | Tube | | | | | |
|---|---|---|---|---|---|---|
| | 1 | 2 | 3 | 4 | 5 | 6 |
| 1 | x | x | o | o | o | o |
| 2 | o | x | x | o | o | o |
| 3 | o | o | x | x | o | o |
| 4 | o | o | o | x | x | o |
| 5 | o | o | o | o | x | x |
| 6 | x | o | o | o | o | x |

Another possible combination consistent with the teachings of the invention comprises the selection of values wherein $p=3$ and $q=3$, and $a=1$ and $b=1$. In such case, each locking element consists of one rectifier connected between cathode $G_j$ and $U_{j+3}$ in a cyclic order (the last number being connected to follow the first number). It is also possible to select a combination, wherein $a=2$ and $b=2$, the grids $G_j$ and $G_{j+1}$ being connected in such event via a common locking element to the anodes $U_{j+3}$ and $U_{j+4}$. Further the combination may be selected to provide a value wherein $a=3$ and $b=3$, but as shown hereinafter the use of such combination for a counting circuit having six states is rather uneconomical.

With reference now to the showing of Figure 3, and assuming a condition where $a=1$ and $b=3$, the specific manner in which switching of the arrangement from a first state to a second state is effected responsive to the receipt of a count advancing impulse is now set forth.

It is initially assumed that the equipment is in the first state (xxoooo), and that a positive going impulse is applied over input terminal $p$ of the counting device via capacitor $Ca$ to the grid $Go$ of switching tube section 0 to drive the same conductive for a short period of time. It will be apparent that a negative going signal will appear on the switching conductor $U_0$ and will be applied over rectifiers $S_{01}$–$S_{06}$ to each of the switching elements. It will be recalled that in the first state, the tube sections 1 and 2 are locked stable in the conductive position, and accordingly a reduced potential is applied over $C_1R_1$ and $C_2R_2$ to the rectifiers $S_{61}$, $S_{62}$ of the first and second switching networks, and since only rectifiers $S_{61}$ and $S_{62}$ of the first and second networks are thus biased by a negative voltage, rectifiers $S_{61}$ and $S_{62}$ alone are operative to establish a negative voltage pulse at the output side of their associated switching elements.

The resultant negative voltage which appears at the central point of the first and second switching elements $W_1$ and $W_2$ is applied over the interconnecting conductors to the input circuits $X_2$, $X_3$ for the second and third locking elements respectively. As a result of the application of the negative going impulse thereto, rectifiers $S_{42}$, $S_{43}$ respectively, couple such pulse to the central point of the associated locking elements. Since the second locking circuit was operative in the first state, the associated rectifiers $S_{12}$, $S_{22}$, $S_{32}$ for the second section remain in their locked condition and maintain the negative bias on the grids of stages 4, 5 and 6. Moreover rectifiers $S_{13}$, $S_{23}$, $S_{33}$ in the third locking network are now operative to apply a negative signal to the grid circuits of the tube sections 5, 6, 1 respectively, such action being effected independent of any voltage which may be applied at the time to the rectifier $S_{53}$. As the negative bias signal is applied to the grid of the first section, the first counting tube is driven nonconductive, and the positive pulse which appears in the plate circuit thereof is coupled over conductor $U_1$ to rectifier $S_{51}$ in the first locking network to effect the unlocking thereof. As the locking signal for the first locking network is thus removed, the negative bias coupled to tube sections 3–5 by its associated rectifiers $S_{11}$, $S_{21}$, $S_{31}$ is likewise removed and tube 3 is now rendered conductive. As tube 3 conducts, a negative going potential is applied over conductor $U_3$ to rectifier $S_{53}$ for the third locking network to maintain same in such condition as the signal pulse is removed from input terminal $X_3$.

At this point therefore the tube stages 2 and 3 are conductive and tubes 1, 4, 5 and 6 are nonconductive and the desired second state is represented thereby. The tube stages 2 and 3 are operative to apply selection signals over conductor $VU_2$, $VU_3$ to thereby preselect the second and third switching networks for operation in response to the receipt of the next count advancing impulse.

The counting circuit is cyclically and periodically operated through each of the successive states responsive to the receipt of the successive count advancing signals over the input terminal $p$. The particular set of tube stages operative in each state may be varied by changing the connections of the outputs of the switching networks to different ones of the locking networks.

Thus the alternate manner of interconnecting the networks will result in the following different tube operating sequences.

| State | Tube | | | | | | | | | | | | | | | | | |
|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 1 | 2 | 3 | 4 | 5 | 6 |
| 1 | x | x | 0 | 0 | 0 | 0 | x | x | 0 | 0 | 0 | 0 | x | x | 0 | 0 | 0 | 0 |
| 2 | 0 | x | x | 0 | 0 | 0 | 0 | 0 | x | x | 0 | 0 | 0 | 0 | 0 | x | x | 0 |
| 3 | 0 | 0 | x | x | 0 | 0 | 0 | 0 | 0 | 0 | x | x | x | x | 0 | 0 | x | x |
| 4 | 0 | 0 | 0 | x | x | 0 | x | x | 0 | 0 | 0 | 0 | 0 | 0 | 0 | x | x | 0 |
| 5 | 0 | 0 | 0 | 0 | x | x | 0 | 0 | x | x | 0 | 0 | x | x | 0 | 0 | 0 | 0 |
| 6 | x | 0 | 0 | 0 | 0 | x | 0 | 0 | 0 | 0 | x | x | 0 | 0 | 0 | x | x | 0 |

In the event that the value of $n$ is even, certain of these arrangements are not particularly practical and further simplification of the switching in the manner described hereinafter may be in order.

It is noted that if the rectifiers are reversed, the counting circuit changes to an arrangement in which $p=4$ and $q=4$ and $a=1$ and $b=3$. In such event the relationship $p-q$ and $a-b$ is satisfied. Further the choice of $a=1$ and $b=3$ is equivalent to the case of $a=3$ and $b=1$ as will be readily apparent.

Figure 4:
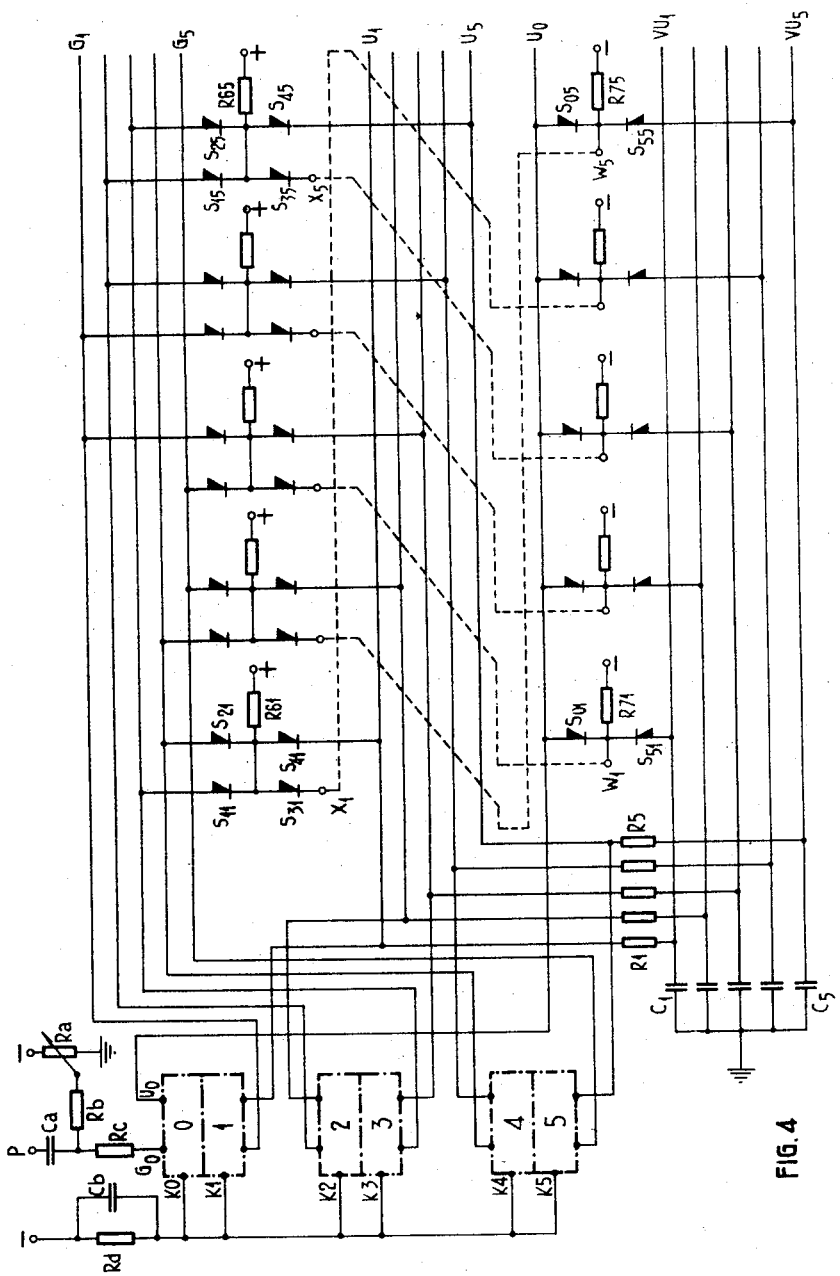

As a further example of the flexibility of the basic concepts of the present invention, a five-fold counting circuit is shown in Figure 4. In the disclosed arrangement $p=2$ and $q=3$, and it is apparent that a combination of $a=1$ and $b=2$; or $a=2$ and $b=3$ may be selected. For reasons of economy, the illustrative arrangement includes the relationship wherein $a=1$ and $b=2$. The input circuits, the counting tube section, the switching networks and the delay circuit of Figure 4 are identical to the structure set forth in Figure 3, the arrangement differing only in that each locking circuit comprises four instead of five rectifier units. Two of the rectifiers in the locking circuit of the five fold chain are interconnected with the grid structures of the tube sections ($b=2$). For purposes of example, the connections between the output of the switching networks and the input of the locking networks has been shifted one unit from the showing of Figure 3.

The operation of the circuit responsive to the application of a count advancing signal to the input circuit $p$ is analogous to the switching process set forth with relation to Figure 3. As in previous examples, the tubes operated as each successive count advancing impulse is received may be adjusted by varying the connections between points $X_1$, $X_5$ and $W_1$, $W_5$. The specific nature of the operation being set forth hereafter in chart form.

| State | Tube | | | | | | | | | | | | | | |
|---|---|---|---|---|---|---|---|---|---|---|---|---|---|---|---|
| | 1 | 2 | 3 | 4 | 5 | 1 | 2 | 3 | 4 | 5 | 1 | 2 | 3 | 4 | 5 |
| 1 | x | x | 0 | 0 | 0 | x | x | 0 | 0 | 0 | x | x | 0 | 0 | 0 |
| 2 | 0 | x | x | 0 | 0 | 0 | 0 | x | x | 0 | 0 | 0 | 0 | x | x |
| 3 | 0 | 0 | x | x | 0 | 0 | 0 | 0 | 0 | x | 0 | x | x | 0 | x |
| 4 | 0 | 0 | 0 | x | x | 0 | x | x | 0 | 0 | x | 0 | 0 | 0 | x |
| 5 | x | 0 | 0 | 0 | x | 0 | 0 | 0 | x | x | 0 | 0 | x | x | 0 |

As noted heretofore, the switching process may be simplified considerably by connecting points $W_1$ to $W_n$ directly via a decoupling rectifier to a control grid, the only restriction in such arrangement being that two successive states must have at least one conductive counting tube in common.

Figure 5:
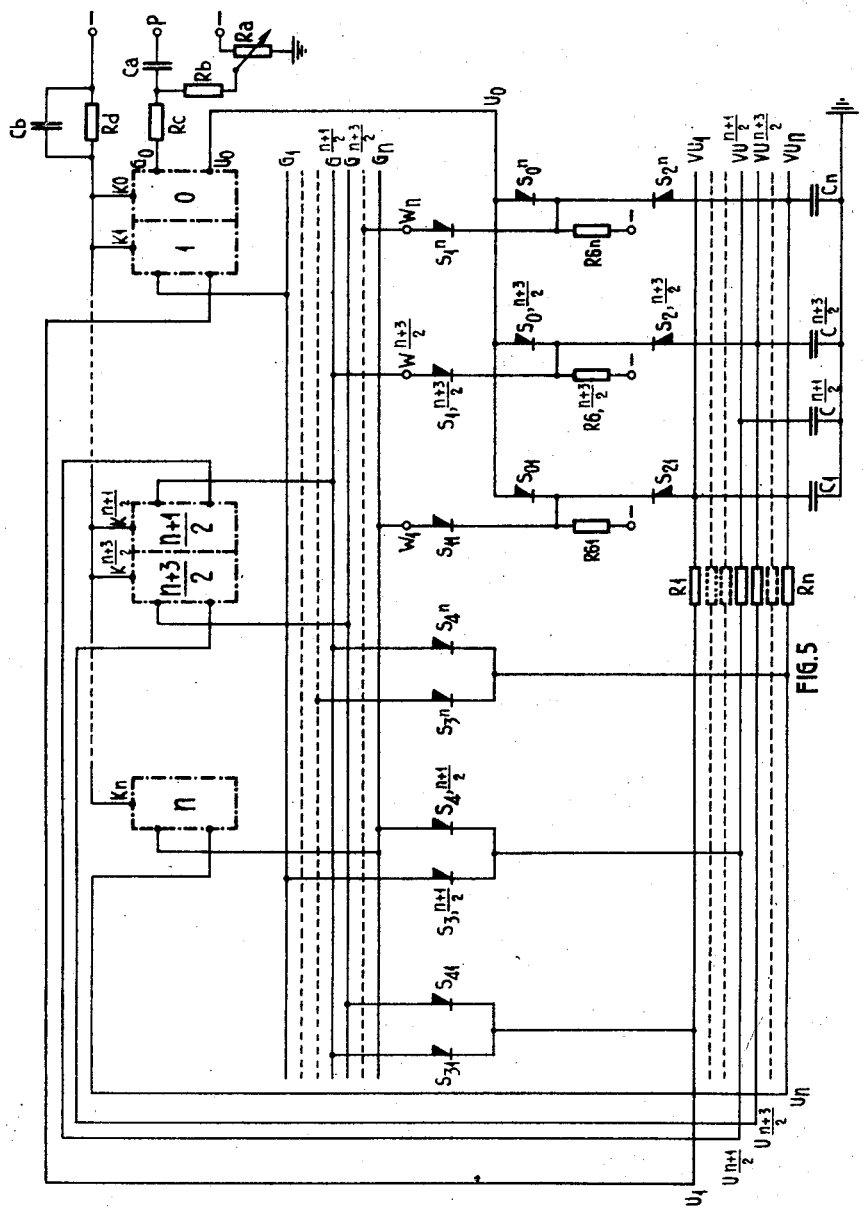
Fig. 5 illustrates symbolically the circuit of an $n$-fold counting circuit.

In a further example set forth in a generic manner in Figure 5, the arrangement includes an odd number of counting tubes $n$ wherein $p-q=1$ and $a-b=1$. In such arrangement, an input circuit $p$ of the type set forth in Figure 3 applies count advancing signals to the input section of the switching tube 0, which tube is effective to couple a negative impulse over the output conductor $U_0$ to the input circuits for the switching networks $W_1$–$W_n$. The output circuits of the switching elements are connected to the locking elements to effect advancement of the count to the next subsequent state responsive to the receipt of each incoming impulse, and are controlled in their sequence of operation by the output signals received from the counting tube sections $n$ over the delayed anode conductors $VU_1$, $VU_n$.

Each switching network comprises a rectifier SO connected to the switching conductor $U_0$, and a rectifier $S_2$ connected to a delayed output voltage conductor VU, the rectifiers being connected to a central point with a resistor $R_6$ in the manner of the previous disclosure. Additionally a rectifier $S_1$ is connected between the central point and a grid of one of the tube sections or stages which is preassigned thereto. The nature of such connection is more fully set forth in the following description.

It is apparent that the concepts set forth in Figure 5 are intended to be generic to each of the arrangements wherein an odd number $n$ of counting tubes is provided, and $p-q=1$ and $a-b=1$. The specific manner in which such arrangement is operative will be more apparent with reference to Figure 8, wherein the circuit is specifically illustrated in a nine-fold counting arrangement where $b-q=1$; $a=1$; $b=2$; $b-a=1$.

With reference thereto, it is initially assumed that the arrangement is in the first state (tube sections 1—4 conducting, tube sections 5—9 non-conducting). As a result, a negative voltage is coupled to the output terminals $U_1$—$U_4$ of tube sections 1—4 via rectifiers $S_{31}$, $S_{41}$ to $S_{34}$, $S_{44}$ to the grids of tube sections 5—9 to lock such tubes in the nonconductive condition. In each of the nine states in which four successive counting tubes are conductive an analogous locking is effected by the circuit arrangement.

Assuming now that the circuit is in the first state, and a count advancing signal is coupled to the switching section 0, a negative output pulse is responsively coupled by the switching section 0 over conductor $U_0$ to the rectifiers $S_{01}$—$S_{09}$ which in turn couple the pulse to the central points of the respective switching elements. In that tubes 1—4 are conductive in the first state, their anode potentials are at a negative value, and a negative potential is applied via rectifiers $S_{21}$—$S_{24}$ to the central points of the first four switching elements controlled thereby. Tube sections 5—9, however, are non-conductive in the first state, and the relatively positive anode potentials coupled thereby to the lower portions of rectifiers $S_{25}$—$S_{29}$ prevents operation thereof even though rectifiers $S_{05}$—$S_{09}$ respond to the pulse on switching conductor VU.

Thus the total effect of
(1) The negative potentials applied via rectifiers $S_{01}$—$S_{04}$, effected by the control impulse;
(2) The negative potentials applied via rectifiers $S_{21}$—$S_{24}$, effected by the conductive condition of tubes 1—4; and
(3) The negative potentials applied via resistors R61—R64, coupled to negative battery, as coupled to the central points of the first four switching elements, is such as to effect the coupling of a negative potential via rectifiers $S_{11}$—$S_{14}$ to grids $G_7$, $G_8$, $G_9$ and $G_1$, respectively. Tube sections 7—9 were already in the non-conductive condition, and so the negative potentials applied to grids $G_7$—$G_9$ does not change the operative condition of tubes 7—9. Tube 1, however, was in the conductive condition, and the application of the negative potential to its control grid ($G_1$) serves to reduce the current flow in tube section 1, to thereby transfer tube 1 to the nonconductive condition. The output terminal $U_1$ now exhibits a positive potential, which is applied via rectifiers $S_{31}$ and $S_{41}$ to the control grids $G_5$ and $G_6$ of tube sections 5 and 6, respectively. Additionally another positive potential, from $U_9$ (tube 9 is presently nonconductive) is coupled via rectifier $S_{49}$ to grid $G_5$ of the tube section 5. The combination of these two positive potentials applied to $G_5$ causes tube 5 to pass from the nonconductive to the conductive condition. The effect of the positive potential applied via rectifier $S_{41}$ to $G_6$, however, is offset by the negative potential applied from $U_2$ (tube 2 is presently conductive) via rectifier $S_{32}$ to $G_6$; accordingly, tube 6 remains in the noncondutive state. As a result of the foregoing sequence of voltage applications, the inventive structure has been shifted from the old (or first) state, in which tubes 1—4 are conductive, to the new (or second) state, in which tubes 2—5 are conductive.

As tube 5 conducts, a negative impulse is coupled over conductor $U_5$ to rectifiers 35, 45 of the fifth locking circuit, and rectifier 45 locks tube 1 on the nonconducting condition. With tubes 2—5 conductive, negative potential over conductive $VU_2$—$VU_5$ prepares the second, third, fourth and fifth switching circuits for operation in response to the receipt of the next impulse.

| State | Tube | | | | | | | | |
|---|---|---|---|---|---|---|---|---|---|
| | 1 | 2 | 3 | 4 | 5 | 6 | 7 | 8 | 9 |
| 1 | x | x | x | x | 0 | 0 | 0 | 0 | 0 |
| 2 | 0 | x | x | x | x | 0 | 0 | 0 | 0 |
| 3 | 0 | 0 | x | x | x | x | 0 | 0 | 0 |
| 4 | 0 | 0 | 0 | x | x | x | x | 0 | 0 |
| 5 | 0 | 0 | 0 | 0 | x | x | x | x | 0 |
| 6 | 0 | 0 | 0 | 0 | 0 | x | x | x | x |
| 7 | x | 0 | 0 | 0 | 0 | 0 | x | x | x |
| 8 | x | x | 0 | 0 | 0 | 0 | 0 | x | x |
| 9 | x | x | x | 0 | 0 | 0 | 0 | 0 | x |

If points $W_1$ to $W_9$ are connected to the successive grids in another way, the circuit can go through the states in another cyclic order of sequence, providing the requirement is met that two successive states have at least one conducting tube in common.

Figure 8:
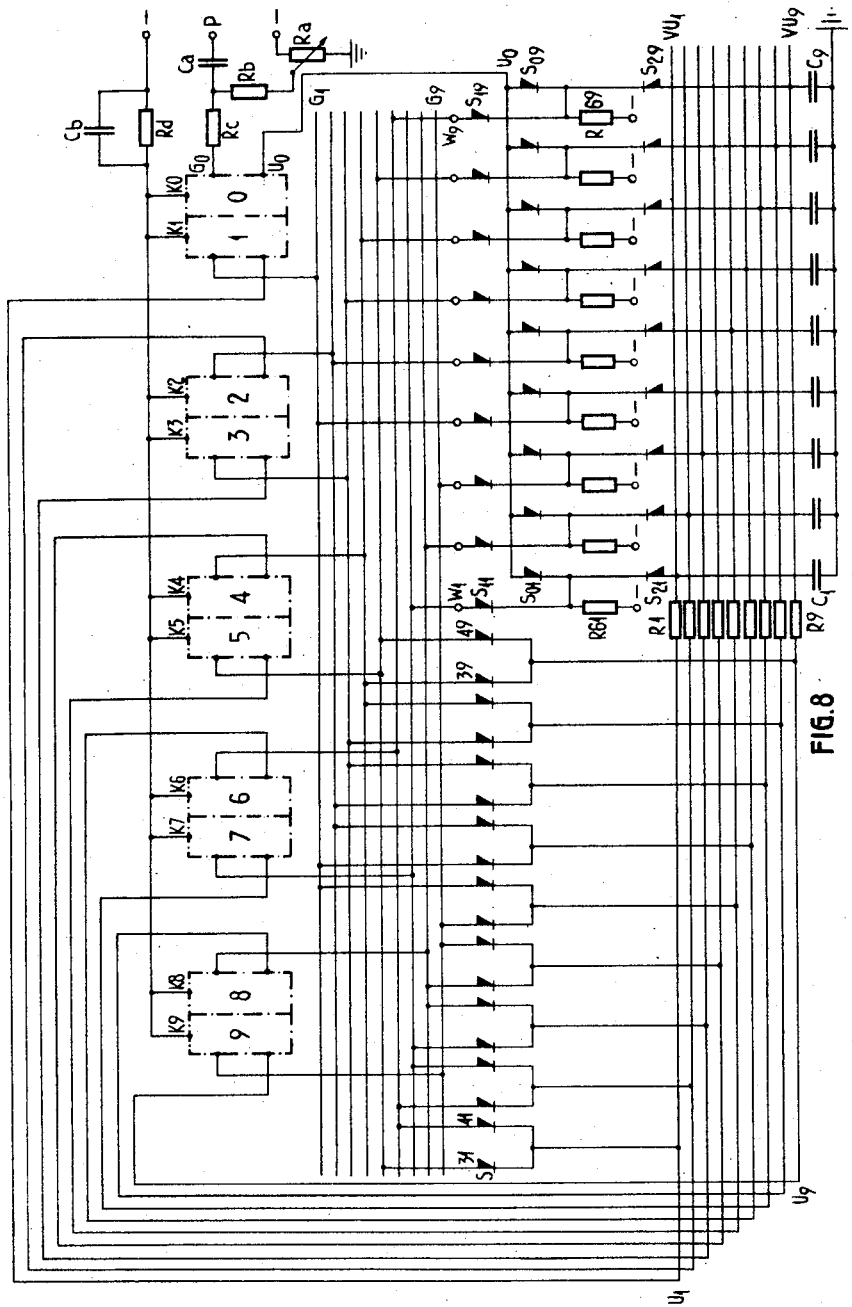
Figure 40:
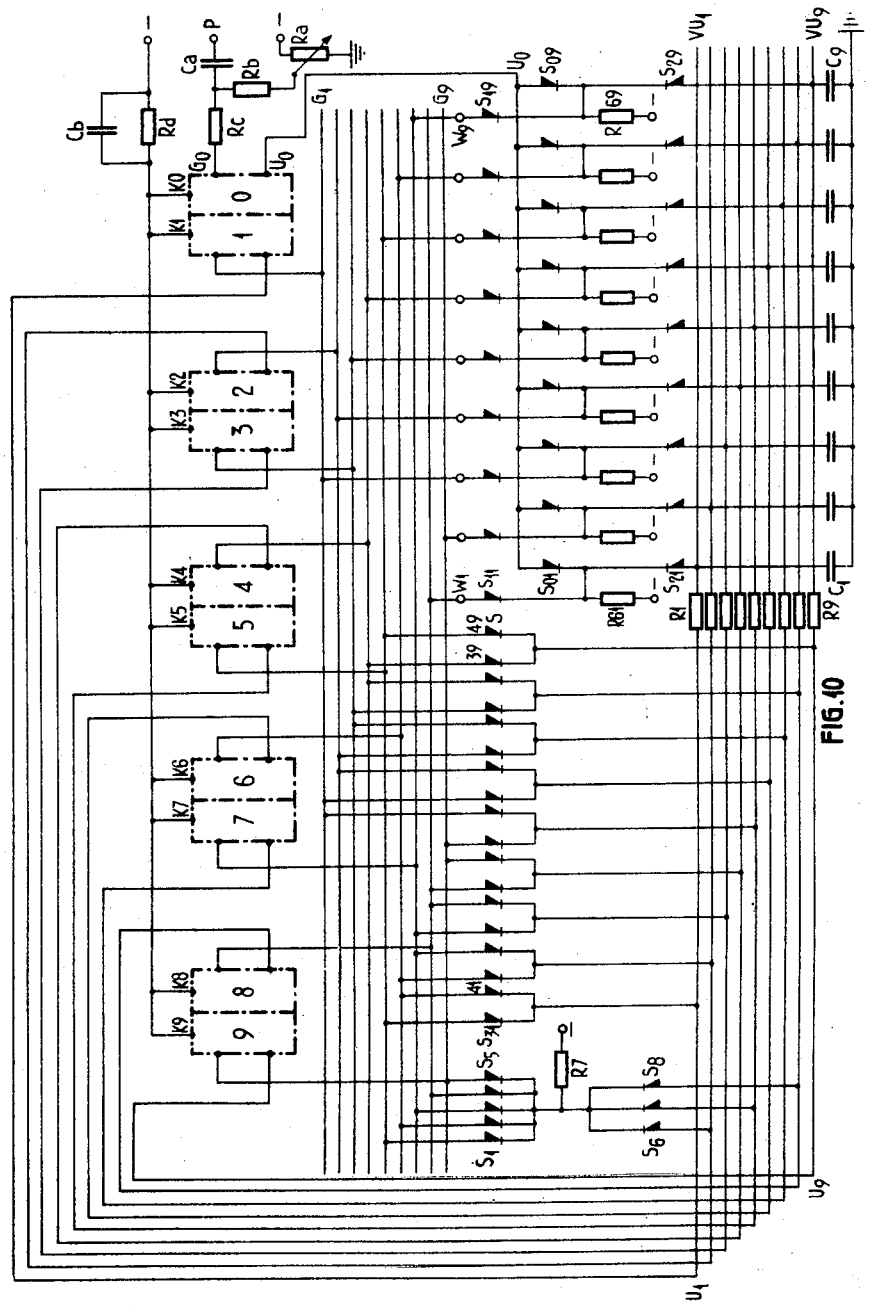

The switching process occurring with the connections according to Fig. 8 occurs generally if point $W_j$ is connected to grid $G_{j-p+1}$ via a discoupling rectifier, etc. If point $W_j$ is connected to point $G_{j-p+2}$, etc. via rectifiers, the switching will be such that two successive states are characterized by the change of conductivity of two successive tubes.

In the example of Fig. 8 the circuit goes through its various states as follows:

| State | Tube | | | | | | | | |
|---|---|---|---|---|---|---|---|---|---|
| | 1 | 2 | 3 | 4 | 5 | 6 | 7 | 8 | 9 |
| 1 | x | x | x | x | 0 | 0 | 0 | 0 | 0 |
| 2 | 0 | 0 | x | x | x | x | 0 | 0 | 0 |
| 3 | 0 | 0 | 0 | 0 | x | x | x | x | 0 |
| 4 | x | 0 | 0 | 0 | 0 | 0 | x | x | x |
| 5 | x | x | x | 0 | 0 | 0 | 0 | 0 | x |
| 6 | 0 | x | x | x | x | 0 | 0 | 0 | 0 |
| 7 | 0 | 0 | 0 | x | x | x | x | 0 | 0 |
| 8 | 0 | 0 | 0 | 0 | 0 | x | x | x | x |
| 9 | x | x | 0 | 0 | 0 | 0 | 0 | x | x |

Figure 6:
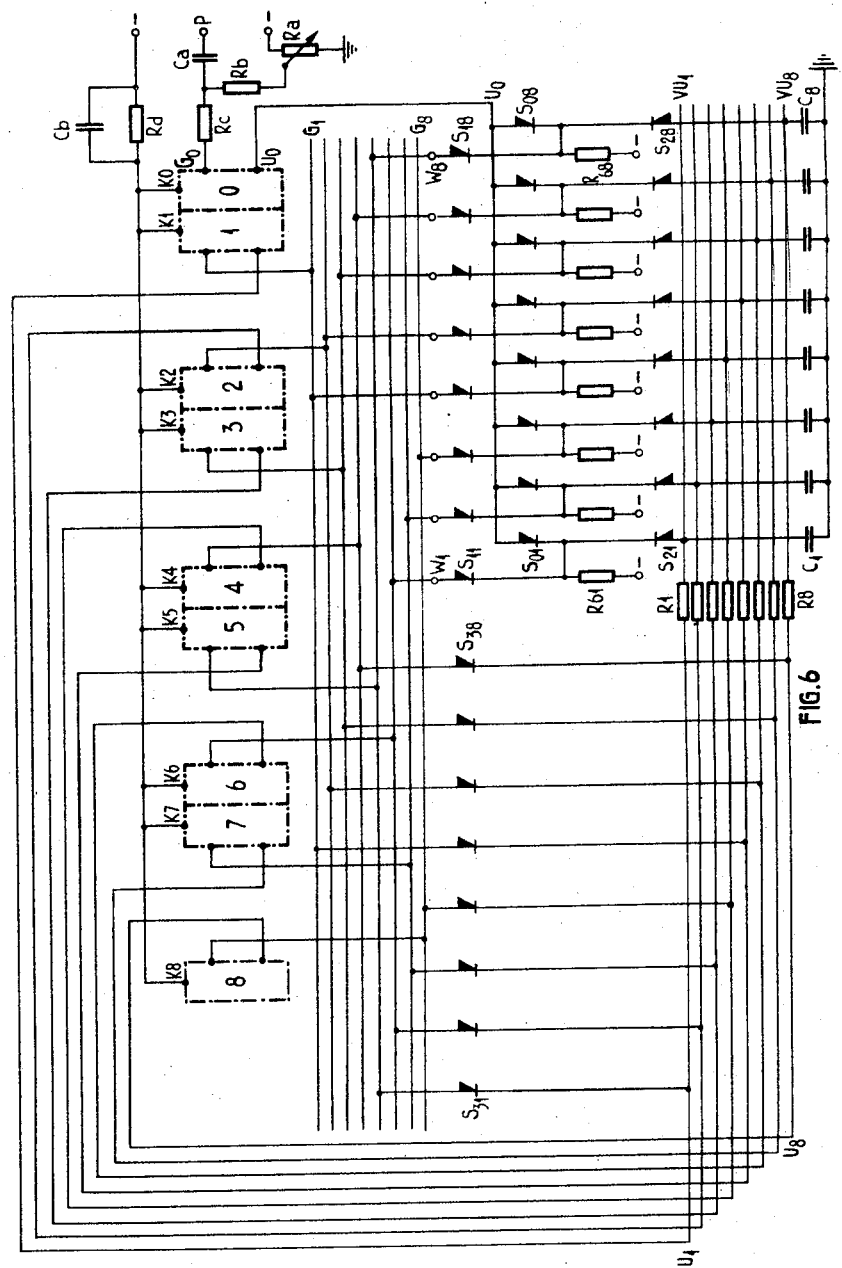
Figs. 6 and 7 are exemplary illustrations of an 8-fold counting circuit according to the general principles of Fig. 5.

Fig. 6 gives an example of an even, notably of an 8-fold counting circuit according to the general circuit of Fig. 5. In this case $p=q=4$, so that there are the following possibilities as regards locking:

$$a=4, b=4$$
$$a=3, b=3$$
$$a=2, b=2$$
$$a=1, b=1$$

The last-mentioned possibility is also the most economical, and is shown in detail in the counting circuit of Fig. 6. It is characteristic of this arrangement, however, that more than one cycle of $n$ states are possible. If one wants to make use of this possibility, the four triggers formed go through all the possible states (24) and normal binary counting circuits are recommended.

The phenomenon described for the circuit of Fig. 6 that the circuit can accomplish more than one cycle of states holds for the general case of an $n$-fold circuit, if $n$ is chosen sufficiently large. This is illustrated by the example of a 9-fold counting circuit in Fig. 8. In practice, a counting circuit, the number of states of which is a prime number, will be of more importance than other counting circuits, because the latter can be split into a number of counting circuits, the number of states of which is a prime number. These are simpler to construct in practice. For simplicity's sake, however, a 9-fold distributor is shown. In this example $/p-q/=1$, $a=1$, $b=2$.

The connection of points W is so chosen that the circuit can go through the 9 states as follows:

| State | Tube | | | | | | | | |
|---|---|---|---|---|---|---|---|---|---|
| | 1 | 2 | 3 | 4 | 5 | 6 | 7 | 8 | 9 |
| 1 | x | x | x | x | 0 | 0 | 0 | 0 | 0 |
| 2 | 0 | x | x | x | x | 0 | 0 | 0 | 0 |
| 3 | 0 | 0 | x | x | x | x | 0 | 0 | 0 |
| 4 | 0 | 0 | 0 | x | x | x | x | 0 | 0 |
| 5 | 0 | 0 | 0 | 0 | x | x | x | x | 0 |
| 6 | 0 | 0 | 0 | 0 | 0 | x | x | x | x |
| 7 | x | 0 | 0 | 0 | 0 | 0 | x | x | x |
| 8 | x | x | 0 | 0 | 0 | 0 | 0 | x | x |
| 9 | x | x | x | 0 | 0 | 0 | 0 | 0 | x |

The following cycle of states is also possible:

| State | Tube | | | | | | | | |
|---|---|---|---|---|---|---|---|---|---|
| | 1 | 2 | 3 | 4 | 5 | 6 | 7 | 8 | 9 |
| 1 | x | 0 | 0 | x | 0 | 0 | x | 0 | 0 |
| 2 | 0 | x | 0 | 0 | x | 0 | 0 | x | 0 |
| 3 | 0 | 0 | x | 0 | 0 | x | 0 | 0 | x |
| 4 | x | 0 | 0 | x | 0 | 0 | x | 0 | 0 |
| 5 | 0 | x | 0 | 0 | x | 0 | 0 | x | 0 |
| 6 | 0 | 0 | x | 0 | 0 | x | 0 | 0 | x |
| 7 | x | 0 | 0 | x | 0 | 0 | x | 0 | 0 |
| 8 | 0 | x | 0 | 0 | x | 0 | 0 | x | 0 |
| 9 | 0 | 0 | x | 0 | 0 | x | 0 | 0 | x |

As nine is a multiple, this cycle of states turns out to contain only three different states. This phenomenon always appears when $n$ is a multiple; one or more of the additional cycles of states has then a number of states which is only equal to a factor of $n$.

This holds for an even as well as for an odd $n$; only in the case of prime numbers do the additional cycles of states comprise all $n$ different states. Consequently, for $n=11$ there are 3 different cycles of 11 states each, of which for each cycle one state is given below:

| | Tube | | | | | | | | | | |
|---|---|---|---|---|---|---|---|---|---|---|---|
| | 1 | 2 | 3 | 4 | 5 | 6 | 7 | 8 | 9 | 10 | 11 |
| 1st cycle | x | x | x | x | x | 0 | 0 | 0 | 0 | 0 | 1 |
| 2nd cycle | x | x | 0 | x | x | 0 | 0 | x | x | 0 | −1 |
| 3rd cycle | x | 0 | 0 | 0 | x | 0 | x | x | x | 0 | −1 |

The other 10 states belonging to each cycle can be obtained by cyclic permutation from the states as thus described.

By the use of additional switching elements and a branched switching conductor, as well as means which can temporarily render one of the branches inoperative, this circuit too can be rendered capable of going through all of the thirty-three states. It is apparent therefore that the given means are not restricted in their application, except for the case in which there are no additional cycles of states.

In the case of an odd number $n$ for the additional cycles of states, the difference $/p-q/$ is increased by 2. Consequently, in the given 9-fold counting circuit, $p$ decreases from 4 to 3 for the additional states, whereas in the given 11-fold counting circuit $p$ increases from 5 to 6 in the additional cycles of states. Thus, with an odd $n$ and an even $p$, the latter number proves to decrease by one in the additional cycles of states, whereas with an odd $n$ and an odd $p$ the latter quantity increases by one. In obtaining the most use from the additional states, one must not apply automatic negative grid bias voltage, because it would counteract the described change of $p$. In the event that $n$ is relatively large, an increase or decrease of $p$ by one makes little difference.

In order to prevent the occurrence of additional states, $n$ being a not too large odd number, one can in the first place provide for automatic negative grid bias voltage. Since additional states appear only after the condition wherein $n=9$ the stabilizing effect of this measure is doubtful.

Therefore better results are obtained with a somewhat more complicated construction of the locking elements. In general, it appears that the circuit no longer shows additional states, if the following condition is fulfilled as to the locking networks:

$$3(a+b) > (p+q)$$

For the 8-fold counting circuit in which $(p+q)=8$ this means that if $(a+b) \geq 3$ there will be no additional states. The minimum number of rectifiers by means of which this can be obtained, in such manner that the condition $/a-b/=/p-q/$ is also satisfied, consists of having $a=2$, $b=2$, so that for each locking element 4 rectifiers are required.

If it is possible to take $a$ or $b=1$, the central point of a locking element coincides with an anode, or grid, respectively; and the rectifier in the connection between the central point and the anode or grid may be then omitted.

Consequently, it is obvious to take $/p-q/=2$ for the case $n=8$. Then $a$ will $=1$ and $b=3$, only 3 rectifiers being provided per locking element to satisfy the condition $3(a+b) > (p+q)$.

Figure 7:
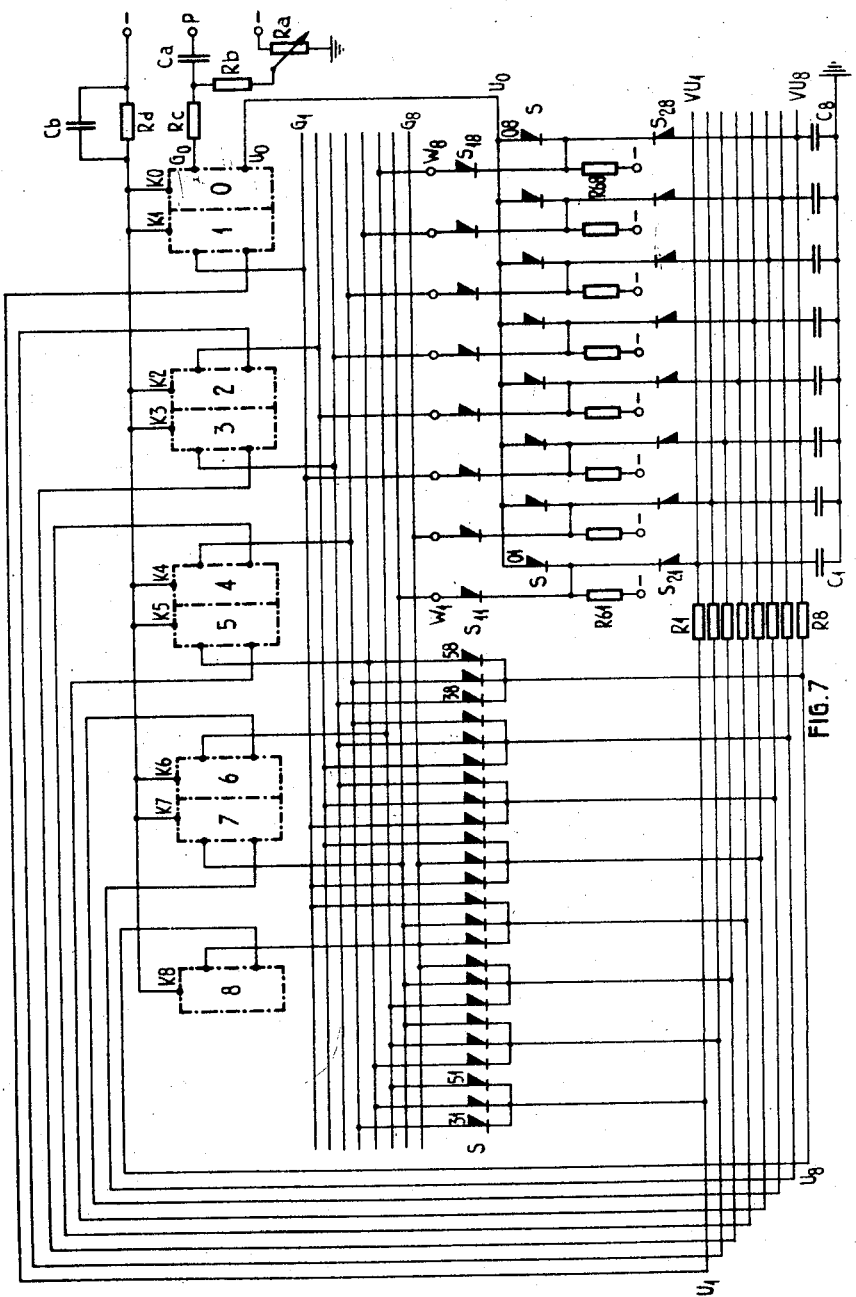

By way of example the circuit diagram of this counting device in which $p=3$, $q=5$; $a=1$, $b=3$ is shown in Fig. 7. Points W of the switching elements are so connected that the circuit goes through its various states in the following order of sequence:

| State | Tube | | | | | | | |
|---|---|---|---|---|---|---|---|---|
| | 1 | 2 | 3 | 4 | 5 | 6 | 7 | 8 |
| 1 | x | x | x | 0 | 0 | 0 | 0 | 0 |
| 2 | 0 | x | x | x | 0 | 0 | 0 | 0 |
| 3 | 0 | 0 | x | x | x | 0 | 0 | 0 |
| 4 | 0 | 0 | 0 | x | x | x | 0 | 0 |
| 5 | 0 | 0 | 0 | 0 | x | x | x | 0 |
| 6 | 0 | 0 | 0 | 0 | 0 | x | x | x |
| 7 | x | 0 | 0 | 0 | 0 | 0 | x | x |
| 8 | x | x | 0 | 0 | 0 | 0 | 0 | x |

In the 9-fold counting circuit of Fig. 8 the additional states can be excluded by maintaining $/p-q/=1$ and taking $a=2$, $b=3$.

It appears then that $3(a+b)=15$, and $15>9$, so that additional states can no longer occur. For each locking element, however, 5 rectifiers are then required. If $/p-q/$ is taken $=3$ on the other hand, so e.g. $p=3$, $q=6$, $a$ can be chosen to be $=1$ and $b=4$, so $b-a=3$, which requires 4 rectifiers per locking element. So this possibility is to be preferred to the former from a viewpoint of economy of components. Thus we arrive at the circuit according to Fig. 9. With the given connections of points W to grids G the circuit goes through the 9 possible states in the following order of sequence:

| State | Tube | | | | | | | | |
|---|---|---|---|---|---|---|---|---|---|
| | 1 | 2 | 3 | 4 | 5 | 6 | 7 | 8 | 9 |
| 1 | x | x | x | 0 | 0 | 0 | 0 | 0 | 0 |
| 2 | 0 | x | x | x | 0 | 0 | 0 | 0 | 0 |
| 3 | 0 | 0 | x | x | x | 0 | 0 | 0 | 0 |
| 4 | 0 | 0 | 0 | x | x | x | 0 | 0 | 0 |
| 5 | 0 | 0 | 0 | 0 | x | x | x | 0 | 0 |
| 6 | 0 | 0 | 0 | 0 | 0 | x | x | x | 0 |
| 7 | 0 | 0 | 0 | 0 | 0 | 0 | x | x | x |
| 8 | x | 0 | 0 | 0 | 0 | 0 | 0 | x | x |
| 9 | x | x | 0 | 0 | 0 | 0 | 0 | 0 | x |

It is clear that the given conditions can be applied without restriction of $n$ upwards in a manner which is analogous to the manner in which it is accomplished in the described examples.

With reliable, undisturbed voltage supplies and reliable working switching elements, the counting circuit according to the invention having more than one cycle of states, $3(a+b)$ being $\leq(p+q)$, cannot pass from the desired cycles of states into one of the additional cycles of states. This may occur, however, in the case of trouble or as a result of the switching in systems having poorly regulated voltage supplies and/or defective switching elements. In many applications it may suffice therefore to use the simplest possible locking elements, which in itself offers too little security against failure and to provide an additional locking element, which puts the circuit back into the desired cycle of states, if it passes into a given state of an undesired cycle.

If the counting circuit is used as a distributor e.g., it will be sufficient to provide an additional locking element for one state of each undesired cycle. Should the distributor, when switched in, work in an undesired cycle, it is put in the desired cycle of states again at the said state by the additional locking element corresponding to that state.

By way of illustration the example of Fig. 10 is given, showing the 9-fold counting circuit in which $p=4$, $q=5$; $a=1$, $b=2$. The additional states appearing in this case are:

| State | Tube | | | | | | | | |
|---|---|---|---|---|---|---|---|---|---|
| | 1 | 2 | 3 | 4 | 5 | 6 | 7 | 8 | 9 |
| 1 | o | x | o | o | x | o | o | x | o |
| 2 | o | o | x | o | o | x | o | o | x |
| 3 | x | o | o | x | o | o | x | o | o |

Therefore an additional locking element has been provided, which operates at the first additional state. For that purpose, the locking circuit is connected via rectifiers $S_6$ to $S_8$ to output terminals $U_2$, $U_5$ and $U_8$ so that the central point of this additional locking element only becomes negative whenever the circuit assumes the said first state. It is obvious that for any arbitrary state and for any arbitrary $n$ such a locking element can be composed in the manner described for this example by connecting rectifiers to the output terminals of the counting tubes that are conductive in the relevant state.

On the other hand the central point of the additional locking element is connected via decoupling rectifiers to the grids of the tubes which are to be negative in the desired state of the desired cycle.

In the example of Fig. 10 grids $G_5$ to $G_9$ are thus connected. For purposes of clarity, all the grids are provided with decoupling rectifiers, $S_1$ to $S_5$, in the disclosed embodiment. However, in the field, for reasons of economy, only a few of these connections are normally provided, the circuit being returned to the desired state by means of the regular locking element and the additional locking circuit.

Thus in the example of Fig. 9 the rectifiers $S_2$, $S_3$ and $S_5$ can be omitted, as their function is taken over by the regular locking elements 2 and 5, and specifically by rectifiers $S_{32}$, $S_{42}$ and $S_{35}$ thereof.

It is obvious that this principle can be applied in a manner fully analogous to what has been described relative to the example of Fig. 10 to all the tube counting circiuts according to the invention in which this is possible.

If the counting circuit is used as a memory circuit, in which, consequently, all or some of the counting tubes are separately set, without switching-forward occurring, only locking elements are needed. It is clear that in such a case the greatest possible mnemonic capacity is provided if the quantities $(a+b)$ and $(a-b)$ are taken as small as possible (and, consequently, $[p-q]$ as small as possible).

The counting circuit according to the invention can be considerably more simplified relative to locking as well as to switching, if $n$ is an odd number. Instead of rectifiers equal ohmic resistors can be used in the locking elements. In such arrangement, it is not desirable to use reduced output voltages.

Figure 11:
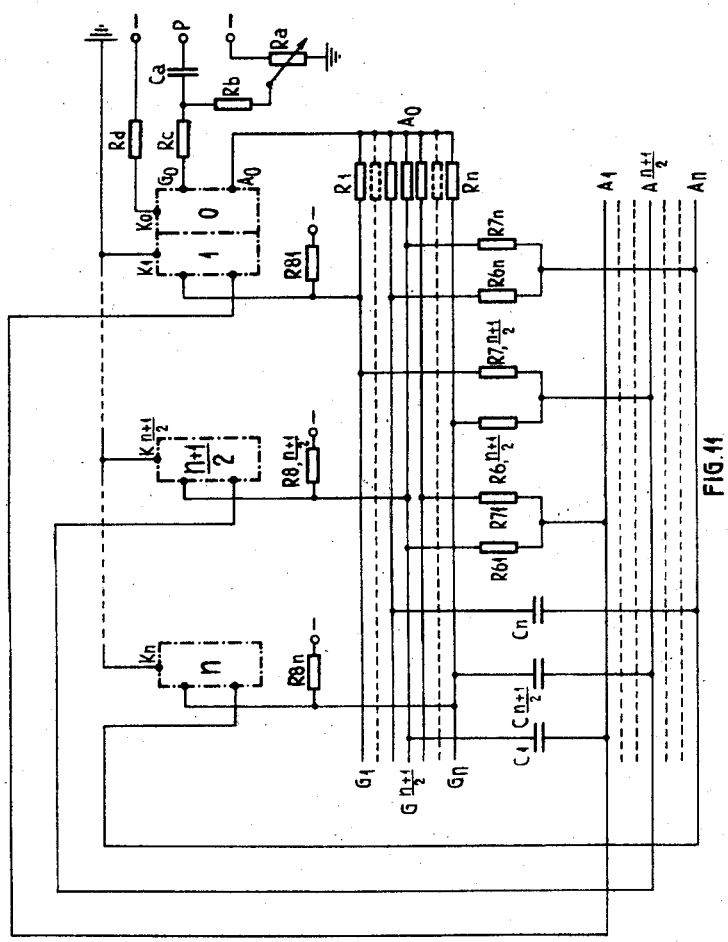
Fig. 11 illustrates symbolically the circuit of a simplified $n$-fold counting device ($n$ being an odd number) according to the invention.

Fig. 11 gives the general case of this variation. The locking elements consist of two equal resistors $R_6$ and $R_7$ in the case of $a=1$, $b=2$ or conversely. These locking resistors are connected directly between the plates of counting tubes and the grids of other counting tubes, which differ in number are placed in cyclic sequence diametrically opposite the first mentioned tubes. A correct voltage level is obtained by connecting the grids of all the counting tubes via separate equal resistors $R_8$ to the negative voltage source. The switching elements in this embodiment comprise capacitors $C_1$ to $C_n$ which are connected in cyclic sequence between the anodes A and the grids G of the counting tubes, and which differ in number by $p$ units. Thus two successive states have no conductive tubes in common, a possibility that also appeared in the variation shown by way of example in Figs. 3 and 4.

Capacitors $C_1$ to $C_n$ combine the functions of a switching element, and, together with the anode resistors of the counting tubes, of a delay network. Switching is done by changing in like degree the grid bias voltage of all the tubes, e.g. by varying the cathode potential. In the figure the same result is obtained, because the switching conductor $A_0$ (in this case directly the anode of the switching tube $o$) is connected via equal resistors $R_1$ to $R_n$ to the control grids $G_1$ to $G_n$ of the counting tubes.

Figure 12:
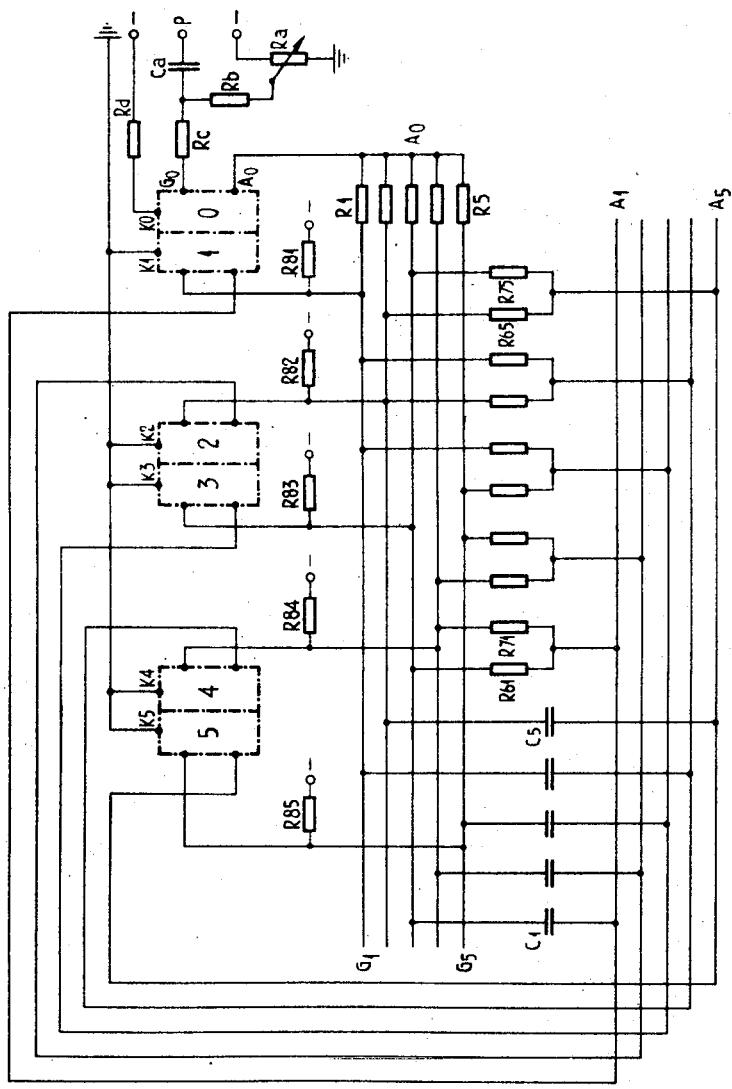
Fig. 12 illustrates by way of example a 5-fold counting device based on the circuit according to Fig. 11.

By way of example Fig. 12 shows a 5-fold counting circuit of simplified construction. When switched further, it goes through its 5 states in the following sequence.

| State | Tube | | | | |
|---|---|---|---|---|---|
| | 1 | 2 | 3 | 4 | 5 |
| 1 | x | x | o | o | o |
| 2 | o | o | x | x | o |
| 3 | x | o | o | o | x |
| 4 | o | x | x | o | o |
| 5 | o | o | o | x | x |

While we have illustrated and described what we regard to be the preferred embodiment of our invention, nevertheless it will be understood that such is merely exemplary and that numerous modifications and rearrangements may be made therein without departing from the essence of the invention.

We claim:

1. An electrical counting system comprising "$n$" counting stages for counting signals received over an incoming path wherein each count is represented by operating an arbitrary number "$p$" of said stages to a first condition, where $p>1$, and for operating a number "$q$" of said stages to a second condition, where $q=n-p$ and $q>1$, different ones of the stages being operated to the first and second conditions to indicate different counts; an electrical switching member for each stage having at least an input terminal for controlling operation thereof, and an output terminal for indicating the condition of the stage at any given time; a plurality of switching elements operative with receipt of each incoming signal over said path to operate to said second condition the particular "$q$" devices which have been assigned to represent the received count, and a plurality of locking elements, each of which includes a number of branches $<n$ coupled between the output terminals of "$a$" consecutive stages and the input terminals of "$b$" consecutive stages, where $|p-q|=|a-b|$ and $p$, $q$, $a$, $b$ and $n$ are integers, whereby said locking elements are controlled by the "$q$" stages operated in a count advance to place the corresponding set of "$p$" stages in said first condition.

2. An electrical counting system comprising "$n$" counting stages for counting signals received over an incoming path wherein each count is represented by operating an arbitary number "$p$" of said stages to a first condition, where $p>1$, and for operating a number "$q$" of said stages to a second condition, where $q=n-p$ and $q>1$, different ones of the stages being operated to the first and second conditions to indicate different counts; an electrical switching member for each stage having at least an input terminal for controlling operation thereof, and an output terminal for indicating the condition of the stage at any given time; a plurality of switching elements, each of which is connected to an output terminal of an associated one of said stages and to the input terminal of a stage which is $p-1$ stages removed from its associated output stage in an operating sequence, means associated with said switching elements operative with receipt of each count advancing signal over said incoming path to operate to said second condition the particular "$q$" devices which have been assigned to represent the received count; and a plurality of locking elements, each of which includes a number of branches $<n$ coupled between the output terminals of "$a$" consecutive stages and the input terminals of "$b$" consecutive stages, where $|p-q|=|a-b|$ and $p$, $q$, $a$, $b$ and $n$ are integers, the "$q$" stages operated in a count advance being operative with said locking elements to place the corresponding set of "$p$" stages in said first condition, and simultaneously to precondition a new set of said switching elements for operation.

3. An electrical counting chain comprising "$n$" counting tubes connected to cycle through successive states upon the receipt of successive signals wherein each count is represented by operating an arbitrary number "$p$" of said tubes to a first condition, where $p>1$, and for operating a number "$q$" of said tubes to a second condition, where $q=n-p$ and $q>1$, different ones of the tubes being operated to the first and second conditions to indicate different counts; an input terminal for each tube for controlling operation thereof, and an output terminal for each tube for indicating the condition of the tube at any given time; input means for receiving successive incoming count advancing signals; a plurality of switching elements operative with receipt of said signals to operate to said second condition the particular "$q$" tubes which have been assigned to represent the received count, and a plurality of locking elements, each of which includes a number of branches $<n$ coupled between the output terminals of "$a$" consecutive tubes and the input terminals of "$b$" consecutive tubes, where $|p-q|=|a-b|$ and $p$, $q$, $a$, $b$ and $n$ are integers, whereby said locking elements are controlled by the "$q$" tubes operated in a count advance to place a corresponding set of "$p$" tubes in said first condition.

4. A counting chain according to claim 3 which includes means for coupling said locking elements and said switching elements to said tube stages to conform to the condition $3(a+b)>n$ and to thereby assure that $n$ and not more than $n$ stably locked cyclically sequential states can occur.

5. A counting chain according to claim 3 which, includes an additional locking element corresponding to a particular state in an undesired cycle connected to prevent the counting chain from cycling through such undesired cycle and to return the chain to the desired cycle upon the occurrence of said particular state.

6. A counting chain according to claim 3, in which $3(a+b)\leq n$ and $n$ is sufficiently large to permit said chain to pass through more than one cycle of states; an additional switching element corresponding to the last state in a particular cycle connected to transitionally switch said chain from said last state to the first state of another desired cycle responsive to advance of the chain to said last state, including means associated with said additional switching element operative to render the conventional switching elements ineffective during the transitional switching.

7. An electronic counting chain comprising $n$ counting tubes, each of said tubes including at least a cathode, a control grid for controlling operation of the tube including means for normally biassing said grid, and an anode connected to indicate the condition of the tube at any given time; control means for controlling said tubes in different combinations to represent different counts which are indicated by signals received over an incoming path wherein, in each count, an arbitrary number $p$ of said tubes are rendered conductive, where $p>1$, and a number $q$ of said tubes are rendered nonconductive, where $q=n-p$ and $q>1$; said control means including a plurality of switching elements connected to the control grids of said tubes to effect operation of the $q$ tubes to the non-conductive condition, means including a plurality of resistive locking elements for rendering the corresponding $p$ tubes conductive, each of which consists of equal resistors connected between the anodes of a preassigned set of said tubes and the control grids of a set of tubes other than said preassigned set, and means for coupling each of said locking elements from a central point along a first path to the anodes of $a$ consecutive tubes and from said central point along a second path to the control grids of $b$ consecutive tubes, where $|p-q|=|a-b|$ and $p$, $q$, $a$, $b$ and $n$ are integers.

8. An electronic counting chain comprising $n$ counting tubes, each of said tubes including at least a cathode, a control grid for controlling operation of the tube, and an anode connected to indicate the condition of the tube at any given time; control means for controlling said tubes in different combinations to represent different counts which are indicated by signals received over an incoming path wherein, in each count, an arbitrary number $p$ of said tubes are rendered conductive, where $p>1$, and a number $q$ of said tubes are rendered non-conductive, where $q=n-p$ and $q>1$, said switching elements consisting of capacitors connected in cyclic sequence between the anodes and control grids of tubes which differ in number by at least the quantity $p-1$; means including a plurality of resistive locking elements for maintaining said $q$ tubes non-conductive after being rendered non-conductive, means for coupling each of said locking elements between the anodes of a first set of $a$ consecutive tubes and the control grids of a second set of $b$ consecutive tubes, where $|p-q|=|a-b|$ and $p$, $q$, $a$, $b$ and $n$ are integers, said first set of tubes comprising a different set of tubes than said second tube set for each locking element; and means for coupling a count selection signal to said switching elements to control same to render a corresponding different set of $q$ tubes non-conductive, which in turn operates to render a correspondingly different set of $p$ tubes conductive and to condition the switching elements for operation to the next successive count with receipt of a further signal.

9. An electronic counting chain circuit comprising a plurality of counting tubes connected for operation to at least a first and a second condition in different combinations to represent different counts, an input terminal for each tube for controlling operation of the tube to said conditions, and an output terminal for each tube for indicating the condition of the tube at any time; means for controlling said tubes to operate in said different combinations, the same number of tubes being operated to one of said conditions in each combination, said means including a plurality of switching elements equal in number to the number of said counting tubes, each of said switching elements being connected to control operation of a preassigned one of said counting tubes to said one condition; means for coupling a signal to said switching elements to control only preselected ones of the switching elements constant with the count in the system to switch their associated tubes to said one condition; and a plurality of locking elements, each of said locking elements being coupled to the output terminal of only a preassigned one of said counting tubes, different locking elements being connected to different tubes, and to the input terminal of at least one counting tube other than said preassigned one of the counting tubes, whereby the ones of the tubes operated to said one condition are effective over the locking element connected thereto to operate a corresponding set of tubes to the other of said conditions.

10. An electronic counting chain circuit as set forth in claim 9 which includes means for connecting said switching elements and said locking elements to said counting tubes to provide a number of states equal to the number of counting tubes.

11. An electronic counting chain circuit comprising a plurality of counting tubes connected for operation to at least a first and a second condition in different combinations to represent different counts, an input terminal for each tube for controlling operation of the tube to said conditions and an output terminal for each tube for indicating the condition of the tube at any time; control means for controlling said tubes to operate in said different combinations, the same number of tubes being operated to one of said conditions in each combination, said control means including a plurality of switching elements equal in number to the number of said counting tubes, each of said switching elements being connected to control operation of a preassigned one of said counting tubes to said one condition; means for coupling a signal to said switching elements to control the preselected ones of the switching elements consistent with the count in the system to switch their associated tubes to said one condition; and a plurality of locking elements, each of said locking elements being coupled to the output terminal of only a preassigned one of said counting tubes, different locking elements being connected to different tubes, and to the input terminals of two consecutive counting tubes other than said preassigned one of the counting tubes, whereby the ones of the tubes operated to said one condition are effective over the locking element connected thereto to operate a corresponding set of tubes to the second condition the tubes operated to the second condition being connected to apply locking signals to said locking elements to maintain the tubes in their respective conditions.

12. An electronic counting chain circuit comprising a given number of counting tubes each comprising an anode, a cathode, and a control grid, said tubes being connected for operation to a first and second condition of conductivity different combinations to represent different counts in accordance with received signals, an arbitrary first number of said tubes being conductive and a second number being nonconductive in each state, said first and second numbers being greater than unity, and said second number being equal to the difference of said given and first numbers; a plurality of switching elements, each of said switching elements being connected to control operation of a preassigned one of said tubes to one of said conditions; means for coupling a count signal to said switching elements to control preselected ones of the switching elements in accordance with the count in the system to switch the tubes connected thereto to said one condition; and a plurality of locking elements, each of said locking elements having a number of branches less than said given number of counting tubes coupled to the anodes of a third number of consecutive counting tubes, different locking elements being connected to different tubes, and coupled to the control grids of a fourth number of counting tubes, which fourth number of tubes is exclusive of said third number, the absolute value of the difference between the first and second numbers being equal to the absolute value of the difference between said third and fourth numbers, said tubes as operated to said first condition being operative to control the interconnected locking elements to place the other tubes in said second condition.

13. An electrical counting system comprising a plurality of count representing stages $n$ connected for operation to a first and second condition in different combinations to represent different counts, same number of stages being operated to one of said conditions in each combination each stage having an input circuit for controlling operation thereof to said conditions and an output circuit for indicating its condition of operation at any given time, a plurality of switching elements, each of which is connected between the output of at least one stage and the input of at least one other stage, different input and output switching elements being connected between different stages, a plurality of locking elements, each of which has a number of branches $<n$ connected to the output of at least one stage and to the input of at least one other stage, and means for applying a count advancing signal to the switching elements to control same to advance the chain to a different count, the ones of the switching elements which are connected to the output of said one stages which were operated to said one condition to represent the previous count being operative to apply a signal to the input side of said other stages which are connected thereto to thereby operate a new set of stages to said one condition, said stages which are thus operated to said one condition being operative in turn to extend signals over their output paths to the ones of the locking elements connected thereto to control same to operate the other of the stages which are connected to the output side of said locking elements to said second condition.

14. An electrical counting chain comprising a plurality of count representing tube members connected for operation to a first and second condition of conductivity in different combinations to represent different counts, the same number of tubes being operated to said first condition in each combination, each member having an input circuit for controlling operation thereof to said conditions and an output circuit for indicating its condition of operation at any given time, a plurality of switching elements, each of which is connected between the output of at least one tube member and the input of at least one other tube member, different switching elements being connected between different tubes, a plurality of locking elements, each of which has a number of branches $<n$ connected to the output of at least one tube member and to the input of at least one other tube member, and means for applying count advancing signals to the switching elements to advance the chain to different counts, the switching elements which are connected to the output of the tubes which were conductive in the previous count being operative with receipt of the count advancing signal to apply a signal to said input for said other tube members connected thereto, to thereby render a new combination of tube members non-conductive; said tube members which are thus rendered non-conductive being operative in turn to extend signals over their output paths to control the locking elements connected thereto to render conductive the remaining ones of the tubes in said chain which are connected to the output side of said locking elements.

15. An electrical counting system comprising a plurality of counting stages connected for operation to a first and second condition of conductivity in different combinations to represent different counts the same number of tubes being operated to said first condition in each combination, each stage having an input circuit for controlling operation thereof and an output circuit for indicating its condition of operation at any given time, switching means including a plurality of switching elements consisting of capacitors, each of which is connected between the output of at least one stage and the input of at least one other stage, different switching elements being connected between different stages, locking means including a plurality of locking elements consisting of equal resistors, each of which is connected to the output of at least one stage and to the input of at least one other stage, and means for applying a count advancing signal to the switching elements to advance the system to a different count, the switching elements which are connected to the ones of the stages which were conductive in the previous count being operative with receipt of the count advancing signal to apply a signal to said stage input circuits connected thereto, to thereby render a new set of stages conductive, said stages which are thus rendered conductive being operative in turn to extend signals over their output paths to indicate their operative condition to the connected ones of the locking elements to control same to render the remaining stages of the chain as connected to the output side of said locking elements non-conductive.

16. An electrical counting system comprising "$n$" counting stages for counting signals received over an incoming path wherein each count is represented by operating an arbitrary number "$p$" of said stages to a first condition, where $p>1$, and for operating a number "$q$" of said stages to a second condition, where $q=n-p$ and $q>1$, different ones of the stages being operated to the first and second conditions to indicate different counts; an electrical switching member for each stage having at least an input terminal for controlling operation thereof, and an output terminal for indicating the condition of the member at any given time; a plurality of switching elements operative with receipt of each incoming signal over said path to provide a signal indicative of the particular "$q$" stages which are assigned to represent the received count; a plurality of locking elements each having a number of branches $<n$, means for coupling each of said locking elements from a central point along a first path to the output terminals of "$a$" consecutive stages and from said central point along a second path to the input terminals of "$b$" consecutive stages, where $|p-q|=|a-b|$ and $p$, $q$, $a$, $b$ and $n$ are integers, said $a$ stages and said $b$ stages being mutually exclusive, said first path including a plurality of rectifiers when $a>1$ and said second path including a plurality of rectifiers when $b>1$, each of said central points following the potential coupled from said output terminal along its associated first path, and each of said input terminals following the resultant of the potentials coupled from its associated central point along its associated second path and the potential coupled from said switching elements, whereby said locking elements are controlled by the "$q$" stages operated in a count advance to place the corresponding set of "$p$" stages in said first condition.

17. An electrical counting system comprising "$n$" counting stages for counting signals received over an incoming path wherein each count is represented by operating an arbitrary number "$p$" of said stages to a first condition, where $p>1$, and for operating a number "$q$" of said stages to a second condition, where $q=n-p$ and $q>1$, different ones of the stages being operated to the first and second conditions to indicate different counts; and electrical switching means for each stage having at least an input terminal for controlling the operation thereof, and an output terminal for indicating the condition of the stage at any given time; a plurality of switching elements operative with receipt of each incoming signal over said path to generate a signal set indicative of the particular "$q$" devices which are to be operated to said second condition to represent the received count, a plurality of locking elements, each of which has a number of branches $<n$ coupled between the output terminals of "$a$" consecutive stages and the input terminals of "$b$" consecutive stages, where $p-q=a-b$ and $p$, $q$, $a$, $b$ and $n$ are integers; an input circuit for each locking element, and means for coupling the signal output of each switching element to the input circuit of a corresponding one of said locking elements to control said locking elements to place the corresponding set of "$q$" stages in said second condition, said stages which are rendered effective as the "$q$" stages for a count being in turn operative to control said locking circuits over said input terminals connected thereto to place a corresponding set of "$p$" stages in said first condition.

References Cited in the file of this patent
UNITED STATES PATENTS

| | | |
|---|---|---|
| 2,540,442 | Grosdoff | Feb. 6, 1951 |
| 2,719,227 | Gordon | Sept. 27, 1955 |